US006636025B1

(12) United States Patent
Irissou

(10) Patent No.: US 6,636,025 B1
(45) Date of Patent: Oct. 21, 2003

(54) CONTROLLER FOR SWITCH MODE POWER SUPPLY

(75) Inventor: Pierre R. Irissou, Sunnyvale, CA (US)

(73) Assignee: ASIC Advantage, Inc., Sunnyvale, CA (US)

( * ) Notice: Subject to any disclaimer, the term of this patent is extended or adjusted under 35 U.S.C. 154(b) by 0 days.

(21) Appl. No.: 10/042,600

(22) Filed: Jan. 9, 2002

(51) Int. Cl.[7] .................................................. G05F 3/16
(52) U.S. Cl. ..................................... 323/313; 363/21.01
(58) Field of Search ................................ 323/312, 313, 323/314; 363/20, 21.01

(56) References Cited

U.S. PATENT DOCUMENTS 5,754,415 A * 5/1998 Blackmon ................ 363/21.16
5,999,421 A * 12/1999 Liu ........................... 363/21.15
6,212,079 B1 * 4/2001 Balakrishnan et al. ...... 323/284
6,462,971 B1 * 10/2002 Balakrishnan et al. ........ 363/95

OTHER PUBLICATIONS

Admitted Prior Art as described in "Description of Power Supply Controller" (4 sheets, including 1 sheet of schematic diagram). Sep. 9, 2002.

* cited by examiner

Primary Examiner—Adolf D. Berhane
(74) Attorney, Agent, or Firm—Girard & Equitz LLP

(57) ABSTRACT

An integrated circuit power supply controller for use in a power supply that provides voltage regulating and current limiting functions. A current limit circuit is provided that includes a band-gap circuit for producing a reference voltage for precisely setting the current limit point, with the band-gap circuit being powered by a current sense voltage indicative of the load current rather than being powered by the regulated output voltage. Thus, the current limit circuit will operate even the power supply output is shorted. Voltage control circuitry is provided also includes a band-gap circuit for precisely controlling the magnitude of the regulated output voltage.

26 Claims, 5 Drawing Sheets

CONTROLLER FOR SWITCH MODE POWER SUPPLY

BACKGROUND OF THE INVENTION

1. Field of the Invention

The present invention relates generally to control circuitry for power supplies and, in particular, to control circuitry for use on the load side of a switch-mode power supply.

2. Description of Related Art

Switching mode power supplies are frequently used to power small appliances such as portable computers and the like where electrical isolation from an AC power source is needed. One advantage of switching mode supplies is that they can be compact in size and yet deliver considerable power. FIG. 1 is a simplified block diagram of a typical prior art switching mode power supply. A rectifier/filter circuit 10 is connected to an AC power source that is typically 110 V 60 Hz for domestic application and 85–265 V, 50/60 Hz for international applications. The output of the rectifier/filter 10 is connected to the primary side of an isolation transformer 12. A Line-Side Controller 14 includes an active switch, such a power transistor 16, which operates to periodically interrupt the connection between the transformer primary and the output of the rectifier/filter circuit 10 so as to introduce an AC component. The switching frequency is relatively high so that transformer 12 can be made relatively small. Details of an exemplary Line-Side Controller 14 are disclosed in U.S. Pat. No. 6,233,165, the contents of which are fully incorporated herein by reference.

The output of the secondary winding of transformer 12 is rectified by diode 18 and filtered by capacitors 20 and 24 and choke 22 to produce a DC output voltage Vout⁺. A Load-Side Controller 26 is included to provide various functions. Among other things, Load-Side Controller 26 provides a control input to the Line-Side Controller 14 by way of optical coupler 28 so as regulate the magnitude of Vout⁺ using pulse width modulation. Load-side Controller 26 also typically provides output short circuit protection and output current limiting functions. Preferably, the Load-Side Controller 26 is powered by the output Vout of the power supply or output V⁺ and does not require the use of an auxiliary power supply.

FIG. 2 is a schematic diagram of an exemplary prior art Load-Side Controller 26 for use in the FIG. 1 switch mode power supply. The FIG. 2 controller is fabricated from discrete components including Zener diode Z1 which is connected to V+ by way of a resistor Rz. The output voltage Vout+, which is related to voltage V+, is equal to the sum of the forward voltage dropped across optical coupler diode 28A, diode D1 and the Zener voltage of Z1. The Zener voltage may be, for example, +4.7 volts. Thus, voltage V+ is approximately +6 volts. If voltage V+ should drop below the target voltage, the current through optical coupler diode 28A will drop, with the Line-Side Controller 14 (FIG. 1) being implemented so as to respond by increasing the output voltage using pulse width modulation. The magnitude of the output voltage can be changed somewhat by changing the value of resistor Rz thereby changing the operating point of the relatively soft knew of Zener diode Z1.

The FIG. 2 load-side controller 26 further includes an NPN transistor Q1 that performs a current limit function. The load current flows through resistors RB and RC, with a fraction of the voltage developed across RB being applied to the base-emitter junction of transistor Q1. At normal output currents, the voltage across RB is not great enough to turn on Q1. However, at greater currents, transistor Q1 will turn on thereby drawing current through resistor RE and the optical coupler diode 28A. The Line-Side Controller 14 (FIG. 1) will respond by reducing the output voltage V+ thereby limiting the output current.

The base-emitter voltage needed to turn transistor Q1 on will vary from transistor to transistor. Thus, it will typically be necessary to manually adjust the value of RB to achieve the desired current limit point. In addition, the base-emitter voltage has a fairly strong negative temperature coefficient. Resistor RT is thermistor device having a positive temperature coefficient resistance that tends to offset the negative temperature coefficient of the base-emitter voltage of transistor Q1. In the event that the output of the supply becomes shorted, that is V+ (or Vout+) is shorted to Vout–, the current limit circuit will continue to operate. No auxiliary power supply is needed to keep the current limit circuit functioning under these conditions.

Resistor RB is selected to produce a voltage greater than that necessary to turn transistor Q1 on, typically the voltage across RB being around 800 millivolts. Resistor RA, RT and RD function to apply only a fraction of this voltage to the base-emitter junction of Q1. Resistor RC is added to produce another approximately 400 millivolts at current limit. Accordingly, when V+ and Vout– are shorted together, a total voltage of 1280 millivolts is dropped across resistors RB and RC for powering the current limit circuitry. That is sufficient to power the current limit circuitry which needs about 1300 millivolts to operate, with that being the sum of the voltage drop across resistor RE, coupler diode 28A and the collector-emitter saturation voltage of transistor Q1.

In order to improve the operation of the FIG. 2 controller, some prior art load-side controllers utilize a commercial integrated circuit programmable shunt regulator in lieu of Zener diode Z1. These shunt regulators, such as regulator sold by Fairchild Semiconductor under the designation TL431 include a band-gap circuit that produces a reference voltage and an error amplifier which compares the reference voltage with the output voltage Vout+, or some fraction of the output voltage set by a resistor divider, so as to provide an adjustable regulated output voltage.

The FIG. 2 controller is inherently imprecise in terms of both voltage regulation and current limit set point. Further, a discrete implementation significantly increases the cost of manufacturing a power supply using the FIG. 2 controller, with low cost being a important factor in this type of power supply.

FIG. 3 shows another prior art Load-Side Controller 26, the primary components of which are implemented in integrated circuit form. Rectification is carried out by a Schottky diode D3 connected to the V– output of transformer 12 (FIG. 1) which replaces diode 18. The FIG. 3 controller 26 includes an auxiliary power supply AS having an input terminal connected to V–. The auxiliary supply AS, which typically includes at least a rectifier diode and filter capacitor (not depicted), has an output connected to power input terminal VCC of the integrated circuit I1 of the FIG. 3 controller.

The integrated circuit I1 includes a band-gap regulator circuit BR that produces a band-gap reference voltage of +2.5 volts. Circuit BR can be trimmed to vary the magnitude of the reference voltage. The reference voltage output of the circuit BR is buffered by a unity gain configured amplifier A1, with the output of A1 being coupled to an inverting input of another amplifier A3 by way of resistor RH. A frequency compensation capacitor Cd is connected between terminal Comp, connected to the inverting input of amplifier A3, and terminal Opto.

The non-inverting input of amplifier A3 is connected a terminal V Sense of the integrated circuit I1. A selected fraction of the output voltage V+ is supplied to terminal V Sense by way of a resistive divider network comprising discrete resistors RI and RJ connected between V+ and Vout−. The output of amplifier A3 is connected to terminal Opto by way of a diode D1. The anode of an optical coupler diode 28A is connected to terminal Opto so that current is supplied to diode 28A by way of diode D1 when the amplifier A3 output is positive.

An external discrete resistor RE is connected between the cathode of diode 28A and a terminal GND of the integrated circuit, with a second external resistor RG being connected between terminal Opto and terminal GND. Voltage regulation is achieved by comparing the selected fraction of the output voltage at terminal V Sense with the reference voltage produced by band-gap circuit BR and modulating the current through optical coupler diode 28A in response to the comparison. As previously noted, the Line-Side Controller 14 (FIG. 1) will adjust the magnitude of the output voltage V+ (or Vout+) by way of pulse width modulation in response to the output of the optical coupler 28. Increased current flow through coupler diode 28A will cause the output voltage V+ to decrease whereas decreased current flow will cause the output voltage to increase.

The FIG. 3 Load-Side Controller further provides a current limit function. A second reference circuit RF is used to generate a 200 millivolt reference voltage which is buffered by an unity gain configured amplifier A2. The output of the amplifier is coupled to the inverting input of an amplifier A4 by way of a resistor RK. The non-inverting input of amplifier A4 is connected to terminal I Sense that, in turn, is coupled to Vout−. The output of amplifier A4 is connected to the terminal Opto by way of a diode D2. A small value external current sense resistor RF is connected between terminals I Sense and GND, with the I Sense terminal also being connected to Vout−. Thus, all of the load current will flow through resistor RF.

The inverting input of amplifier A4 receives the buffered 200 millivolt reference voltage produced by reference circuit RF. The voltage applied to the non-inverting input of the amplifier is equal to the voltage drop across current sense resistor RF. Thus, when the voltage drop across resistor RF reaches 200 millivolts, the current limit point, the output of amplifier A4 will increase thereby causing current to flow through optical coupler diode 28A to increase. The Line-Side Controller 14 (FIG. 1) will respond by reducing the magnitude of the regulated output voltage Vout+ thereby limiting the output current. Diodes D1 and D2 operate to isolate the outputs of amplifiers A3 and A4 when the amplifier outputs are low. Thus, either the voltage regulating amplifier A3 or the current limiting amplifier A4 can independently cause current to flow through the optical coupler diode 28A.

The FIG. 3 Load-Side Controller is superior to the FIG. 2 controller in terms of voltage regulating accuracy and current limit accuracy. Further, the FIG. 3 controller is less expensive to implement in that most of the components are part of integrated circuit I1. However, the FIG. 3 circuit requires the use of auxiliary power supply AS for powering at least the current limit circuitry in the event the output is shorted. As previously noted, it is desirable to avoid an auxiliary power supply in order to reduce costs.

There is a need for switch mode power supply controller which provides high voltage regulation accuracy and high current limit accuracy and which can be implemented in integrated circuit form and which does not require the use of an auxiliary power supply. As will become apparent to those skilled in the art upon a reading of the following Detailed Description of the Invention together with the drawings, the present invention provides these and other advantages.

SUMMARY OF THE INVENTION

A power supply feedback controller for use switch mode power supplies is disclosed. The controller circuitry, which is preferably formed in a single integrated circuit, includes a current sense input that receives a current sense voltage indicative of a magnitude of the power supply load current. Typically, the current sense voltage is produced across a small sense resistor connected to conduct the load current.

Current limit circuitry is included which provides an output indicative of the relative magnitude of the current sense voltage and a first reference voltage produced by a band-gap voltage reference circuit. The band-gap reference circuit is configured so that it is powered by the current sense voltage and thus will operate under short circuit conditions. Also included is voltage control circuitry that provides an output indicative of the relative magnitudes of a sense voltage related to the regulated output voltage. Typically, the sense voltage is produced using a resistive voltage divider connected across the regulated supply output.

The outputs of the current limit circuitry and the voltage control circuitry are combined to provide a feedback signal used to control a Line-Side Controller of the switching power supply. A current mirror circuit may be used to combine the two outputs, with the output of the current mirror circuit typically providing current drive to the input of an optical coupler. Under current limit conditions, the current limit circuitry output will override the output of the voltage control circuitry so that the supply output voltage will decrease thereby limiting the output current.

DETAILED DESCRIPTION OF THE INVENTION

Figure 4:
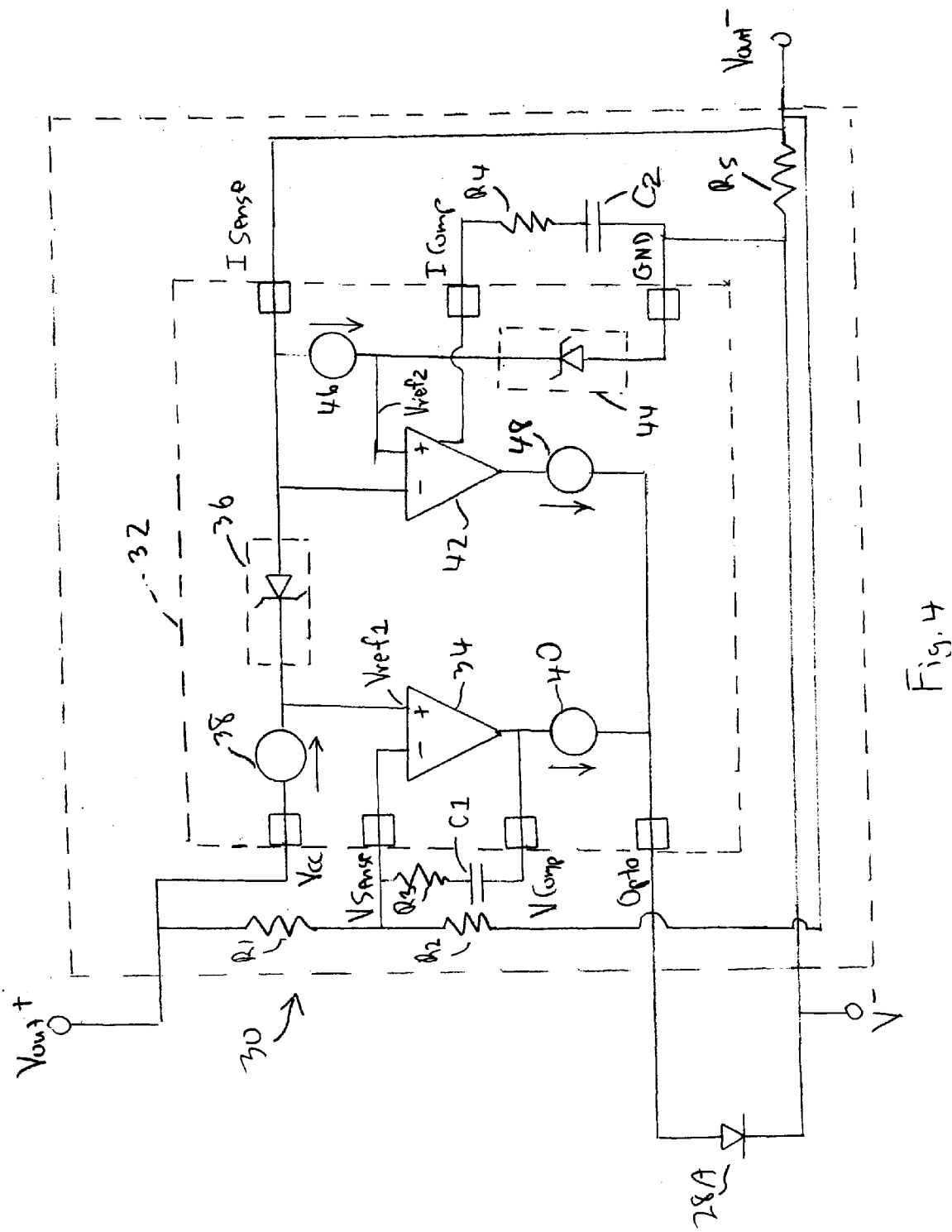
FIG. 4 is a simplified diagram of one embodiment of a controller for a switch mode power supply in accordance with the present invention.

Referring again to the drawings, FIG. 4 is a bock diagram of one embodiment of a Line-Side Controller 30 in accordance with the present invention. The primary components of the controller are readily implemented in an integrated circuit 32. Integrated circuit 32 includes a voltage error amplifier 34 that functions to control the regulated output voltage. The inverting input of amplifier 34 is connected to integrated circuit terminal V Sense, with the non-inverting input being connected to the output of a voltage reference circuit 36. The voltage reference circuit 36 produced a precision voltage that is referenced to a terminal I Sense of the integrated circuit 32.

Figure 1:
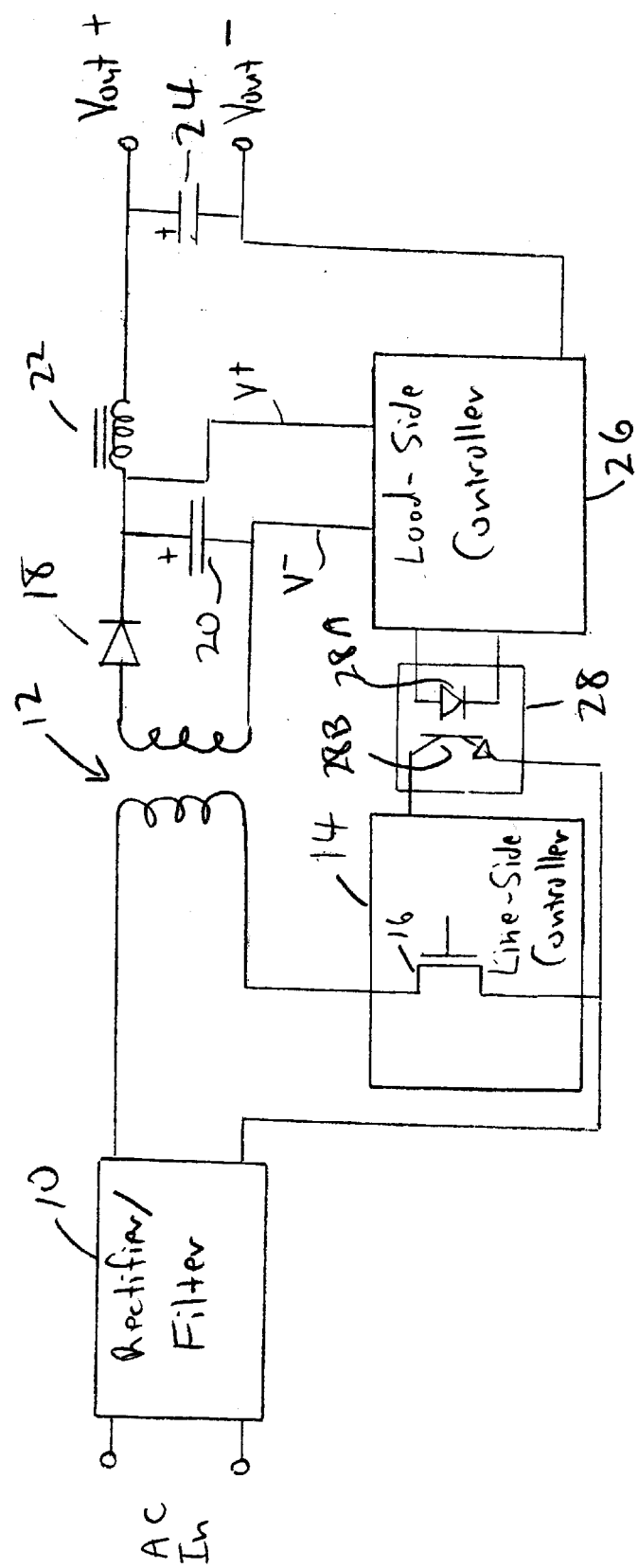
FIG. 1 is a simplified diagram of a conventional prior art switch mode power supply that includes a Load-Side Controller.
Figure 2:
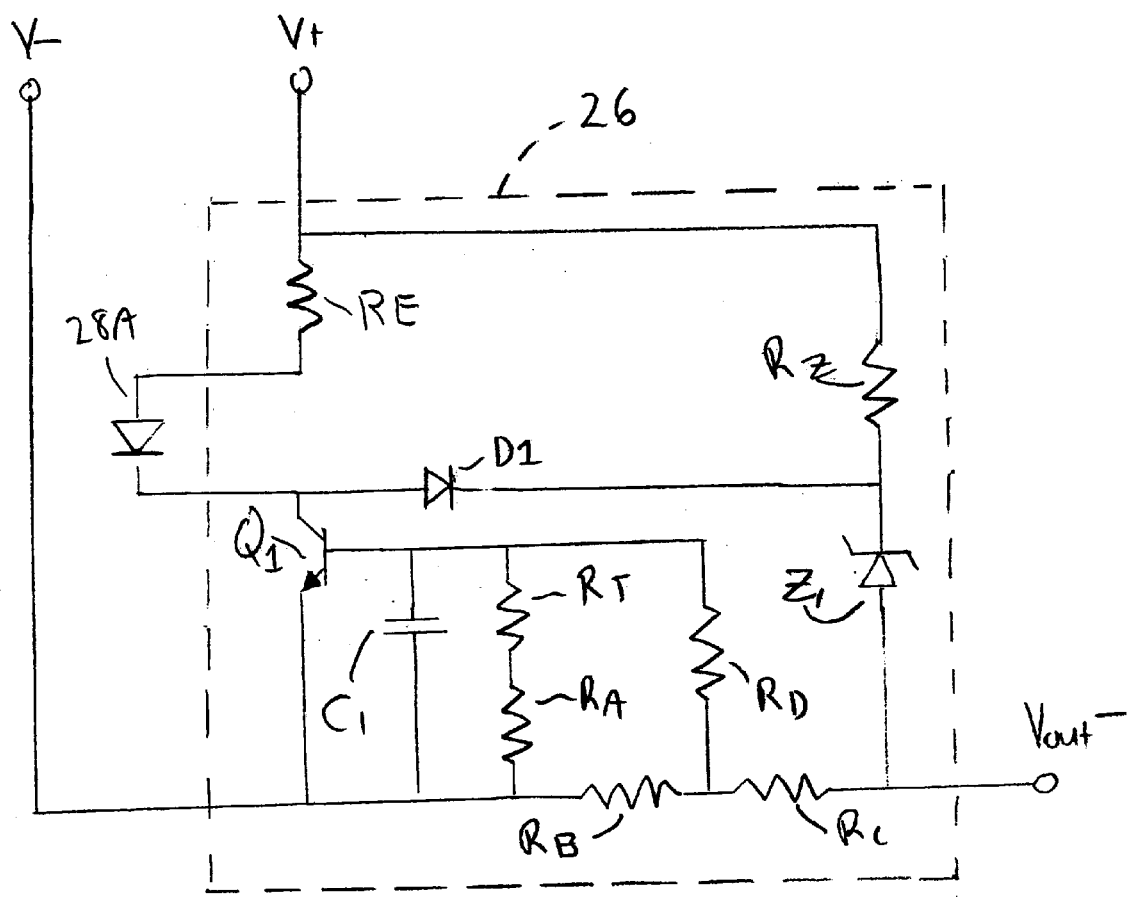
FIG. 2 is a schematic diagram of a typical prior art Line-Side Controller suitable for use in the FIG. 1 switch mode power supply.
Figure 3:
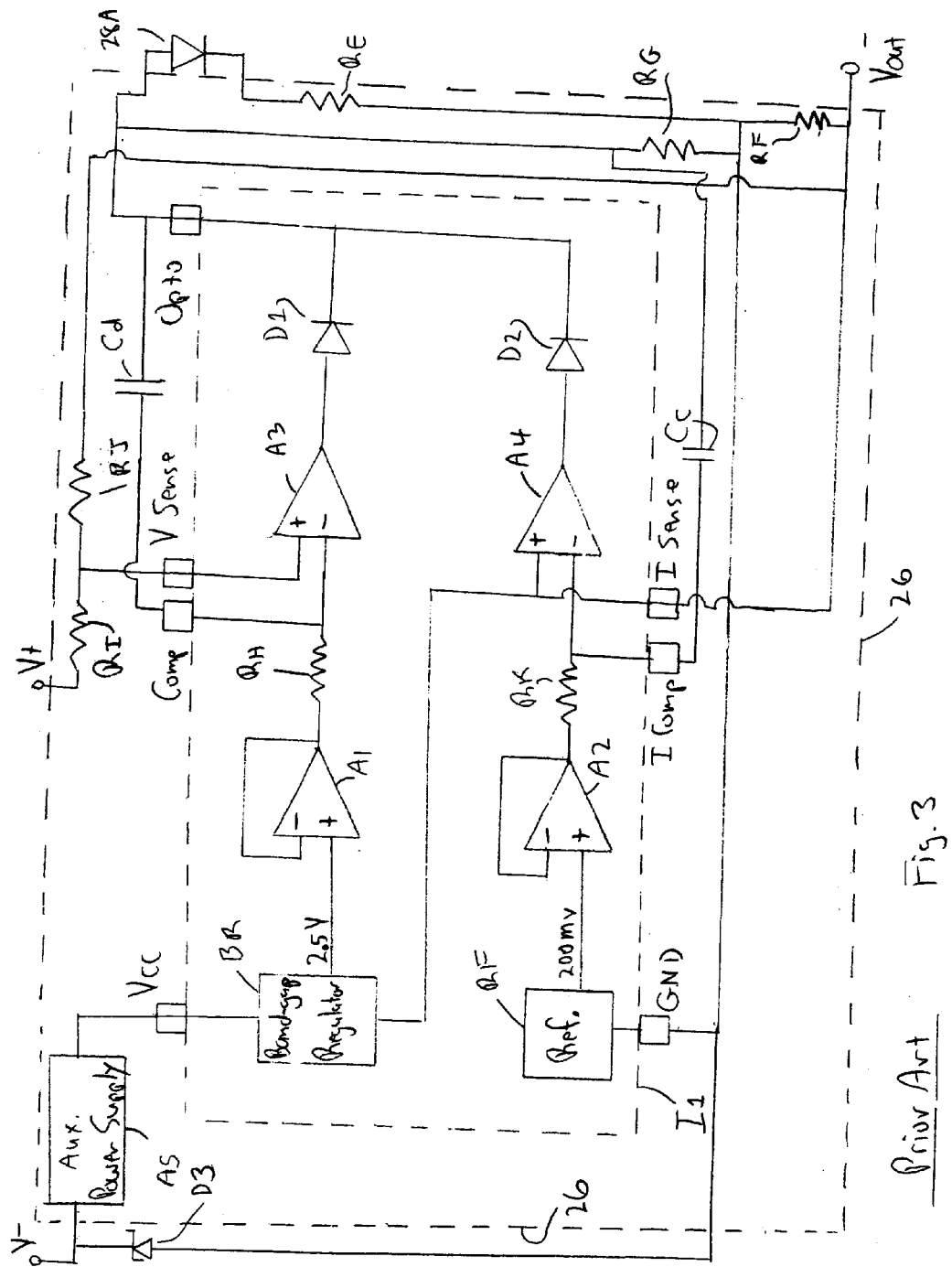
FIG. 3 is a schematic diagram of another prior art Line-Side Controller for a switch mode power supply.

Terminal V Sense is to be connected to an intermediate node of a resistive divider which includes discrete resistors R1 and R2 connected between Vout + and Vout− of the regulator. Note that choke 22 (FIG. 1) is usually not needed so that voltages V+ and Vout+ are the same. Thus, the resistive divider operates to provide a voltage at terminal V Sense that is a selected fraction of the regulated output voltage. Voltage reference circuit 36 is preferably a trimmed band-gap reference circuit that receives current from a current source 38. The phrase band-gap circuit or band-gap reference, as used herein, means a circuit that produces a first voltage having a positive temperature coefficient, derived from a difference in base-emitter voltages of a pair of bipolar transistors, which is combined with a second voltage having a negative temperature coefficient, with the first and second voltages being combined so as to reduce the overall temperature coefficient.

In one exemplary embodiment, the band-gap reference circuit 36 provides a nominal output voltage Vref1 of +2.70 volts. Current source 38 is connected to integrated circuit terminal Vcc that is to be connected to output Vout+ which functions to power the current source. A frequency compensation circuit in the form of series connected discrete resistor R3 and capacitor C1 is to be connected intermediate integrated circuit terminals V Sense and V Comp.

The output of the voltage error amplifier 34 controls the magnitude of a current source 40, with current source 40 having an output connected to an integrated circuit terminal Opto. Terminal Opto is to be coupled to the anode of the external diode 28A of an optical coupler, such as optical coupler 28 of the FIG. 1 supply. The state of the current source 40 output is a function of the relative magnitudes of the voltages at V Sense and Vref1.

Integrated circuit 32 also includes a current error amplifier 42 having an inverting input connected to terminal I Sense and a non-inverting input connected to the output of another band-gap voltage reference circuit 44. The voltage output of circuit 44 is referenced to terminal GND of the integrated circuit, with terminal GND to be connected to return V−. In one exemplary embodiment, the voltage reference circuit 44 provides a nominal output Vref2 of +1.33 volts. Reference circuit 44 receives current from a current source 46 that is connected to terminal I Sense. A frequency compensation circuit in the form of series connected discrete resistor R4 and discrete capacitor C2 is to be connected between terminals Gnd and I Comp of integrated circuit 32. Terminal I Comp is connected to an internal node of current error amplifier 42. The output of current error amplifier 42 operates to control the magnitude of a current source 48 that, along with current source 40, is connected to integrated circuit terminal Opto. The magnitude of the current source 48 output is a function of the difference between the voltage at I Sense and voltage Vref2.

An output current sense resistor Rs is connected intermediate output Vout− and return V−. Thus, substantially all of the load current will flow the resistor Rs. Resistor Rs is also connected between terminals I Sense and Gnd so that the current sense voltage dropped across resistor Rs will be produced between the two terminals. Resistor Rs is set to a value selected to produce a current sense voltage equal to the voltage produced by voltage reference circuit 44 at the desired current limit point. Thus, if the reference circuit output Vref2 is set to +1.33 volts, a value of Rs of 3.3 ohms causes the current limit point to be at about 400 milliamperes.

As can be seen from FIG. 4, the voltage error amplifier 34, voltage reference circuit 36 and associated circuitry are powered by the voltage developed across the load, that is, voltage Vout+. The voltage at the non-inverting input to amplifier 34 is equal to the output voltage Vref1 of the voltage reference circuit 36 (e.g., +2.70 volts). Amplifier 34 will control the state of current source 40, the output of which is fed to optical coupling diode 28A by way of terminal Opto. As previously described in connection with FIG. 1, optical coupler 28 provides an analog feedback signal to a Line-Side Controller, such as controller 14 of FIG. 1. The Line-Side Controller will control the magnitude of the output voltage Vout+ by way of pulse width modulation. Resistors R1 and R2 are precision (1%) resistors having values selected to produce a desired regulated output voltage Vout+ as follows:

$$Vout+ = Vref1(R1+R2)/R2 \qquad (1)$$

The voltage reference circuit 44 and some associated circuitry are powered by the voltage developed across the current sense resistor Rs. At low output currents, amplifier 42 has insufficient voltage for operation, but is implemented so that current source 48, controlled by the output of amplifier 42, is low. Thus, at lower current outputs, the magnitude of the output voltage Vout+ is controlled exclusively by the voltage error amplifier 34 and current source 40. As the output current increases, the voltage drop across resistor Rs will increase so that voltage reference circuit 44 and some associated circuitry become operative. However, unless the output current reaches the selected current limit point, that is, the output current produces a voltage drop across resistor Rs equal to Vref2, current source 48 will remain inactive. Current limiting takes place when the voltage drop across Rs is equal to Vref2. At that point, current source 48 will override the voltage regulation provided by voltage error amplifier 34 and will cause current source 48 to provide current to optical coupler diode 28A thereby limiting the output voltage Vout+ and the output current.

Figure 5:
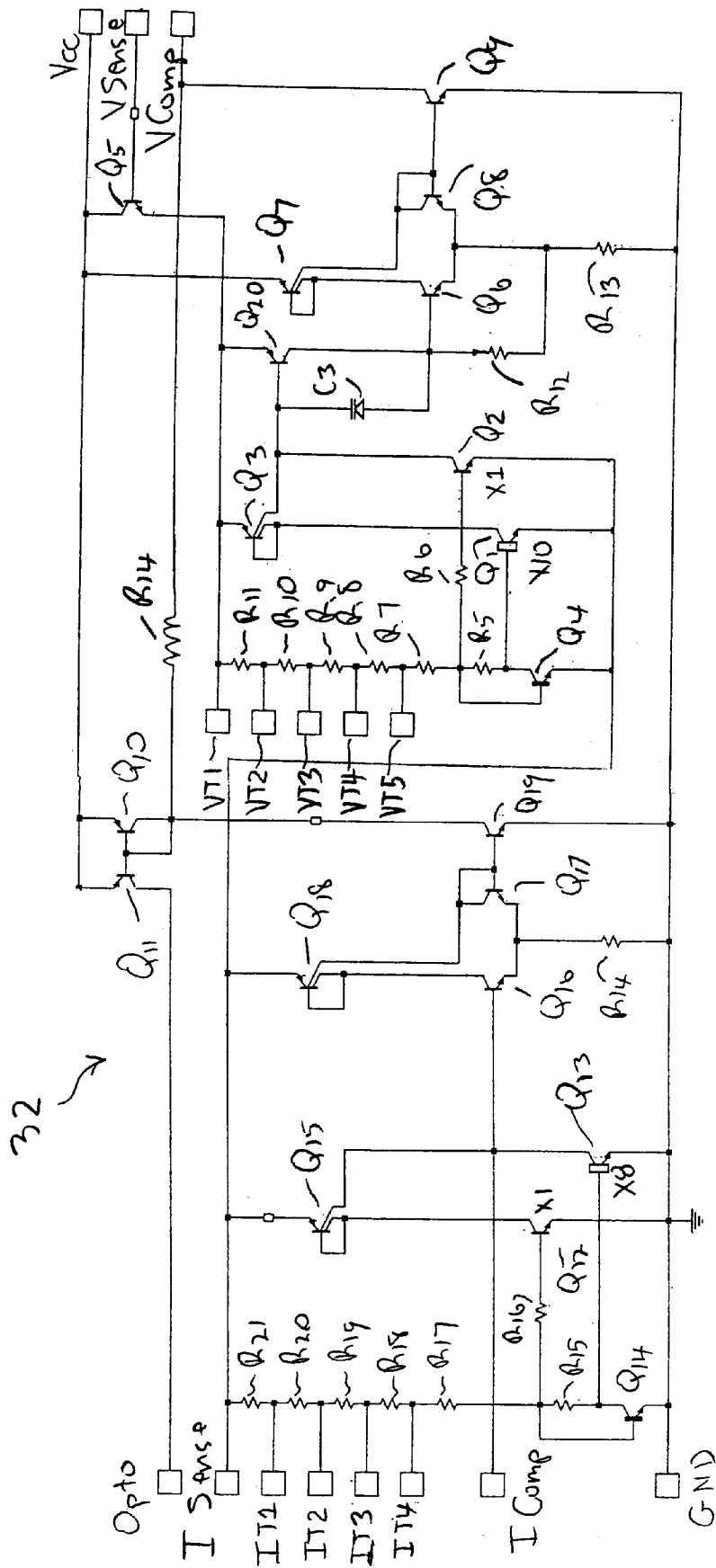
FIG. 5 is a detailed schematic diagram of the FIG. 4 controller.
Figure 1:
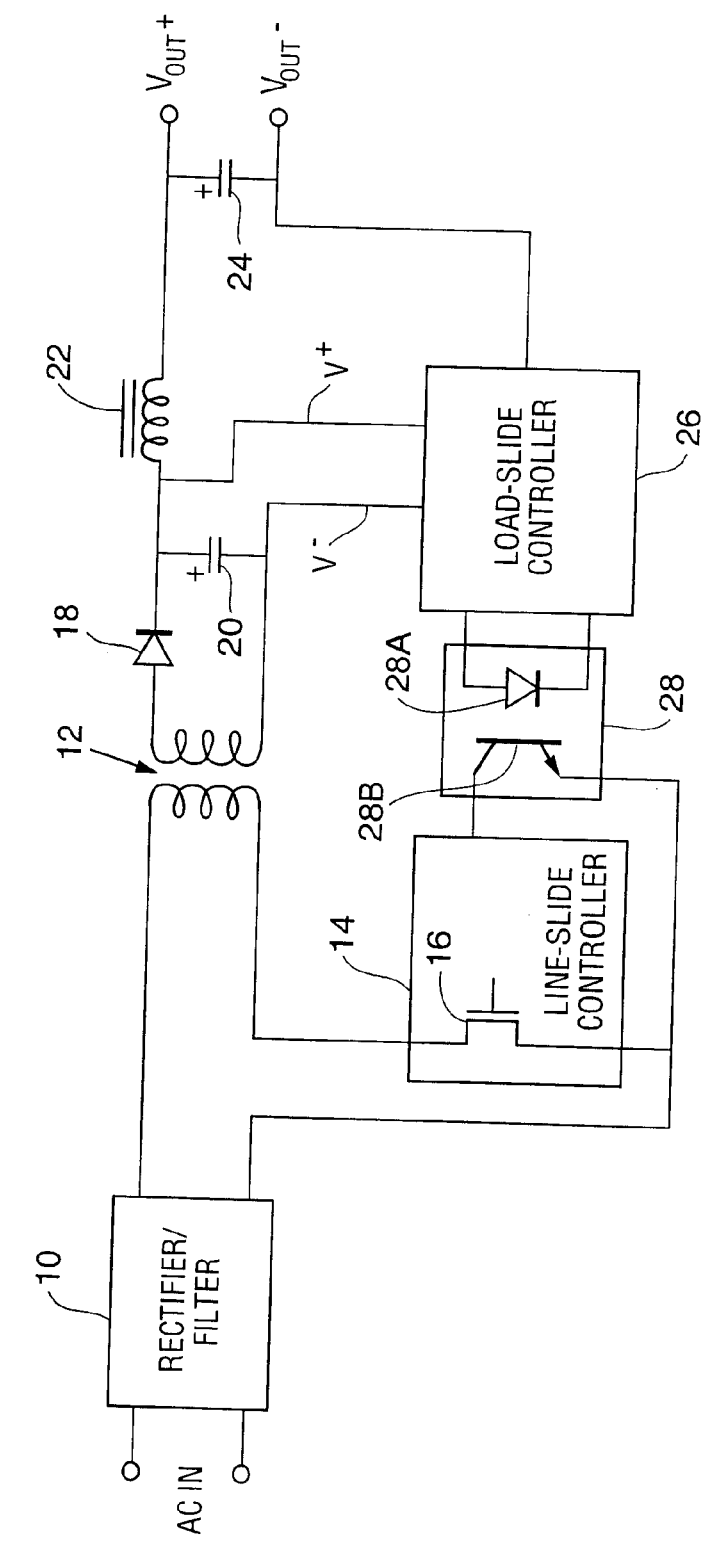
Figure 2:
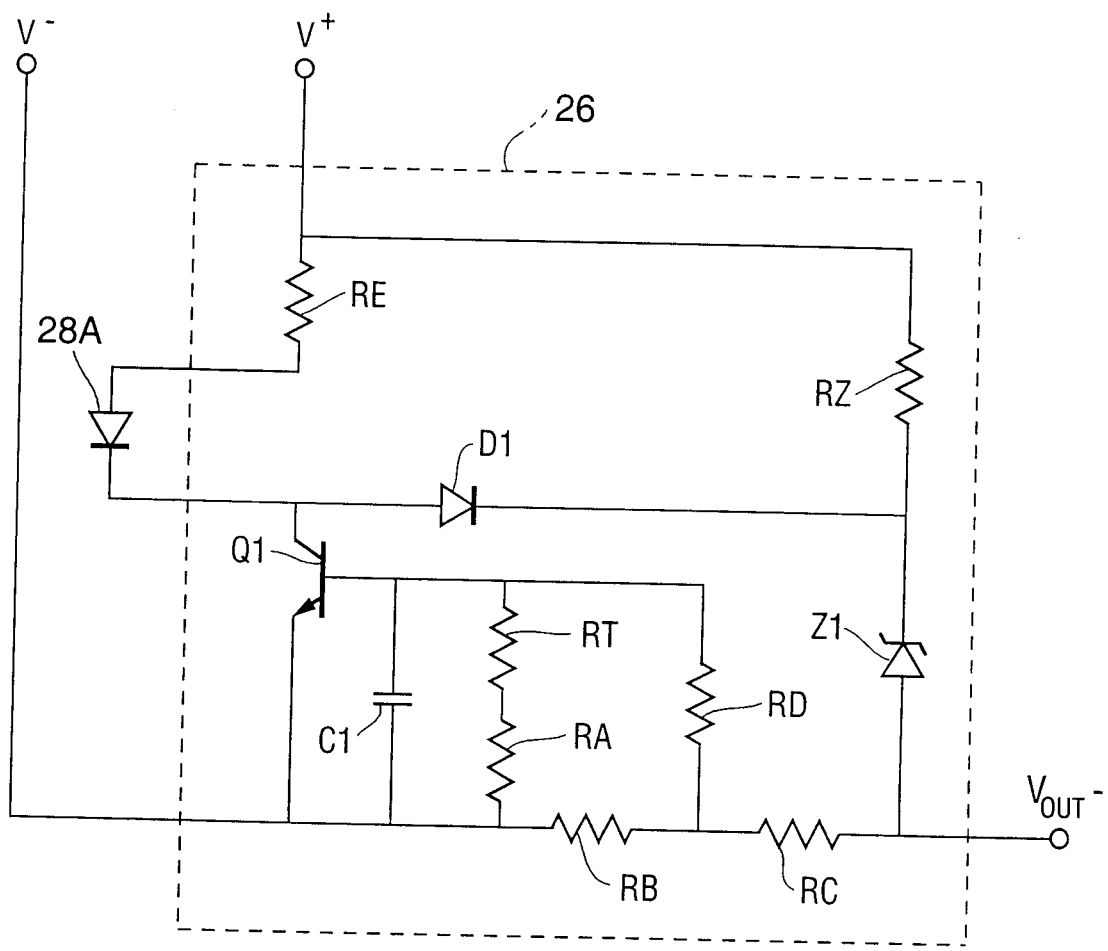
Figure 3:
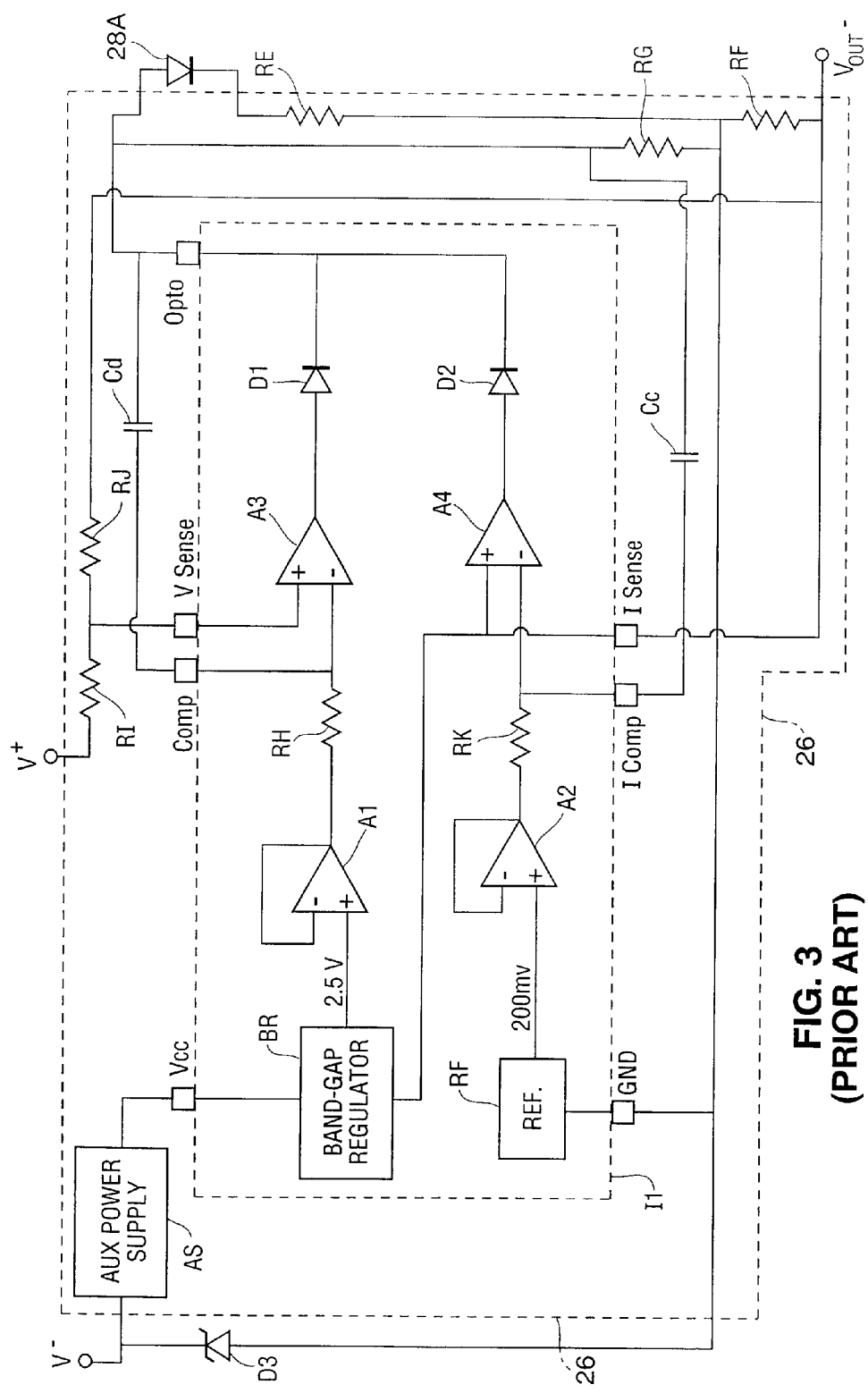
Figure 4:
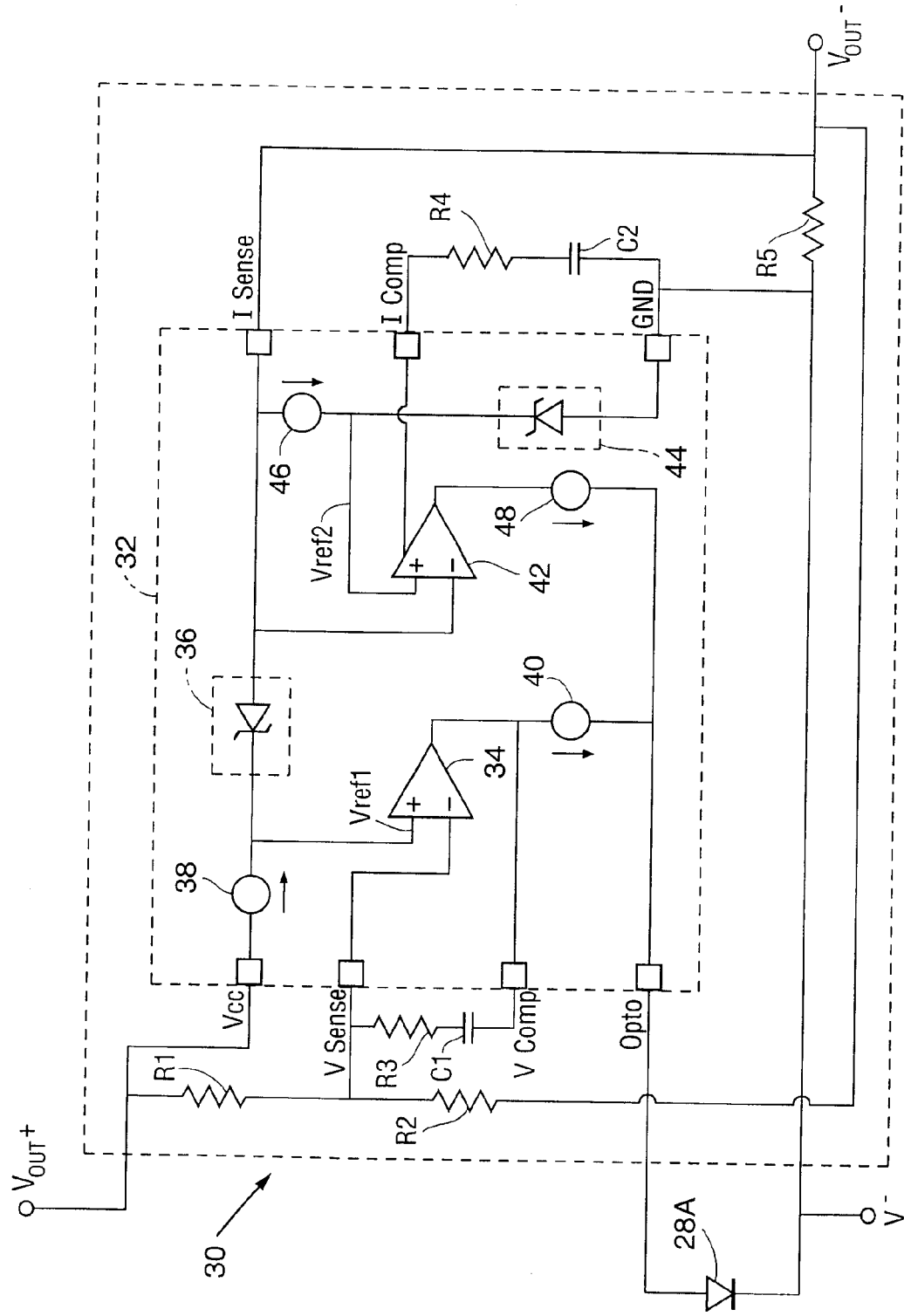
Figure 5:
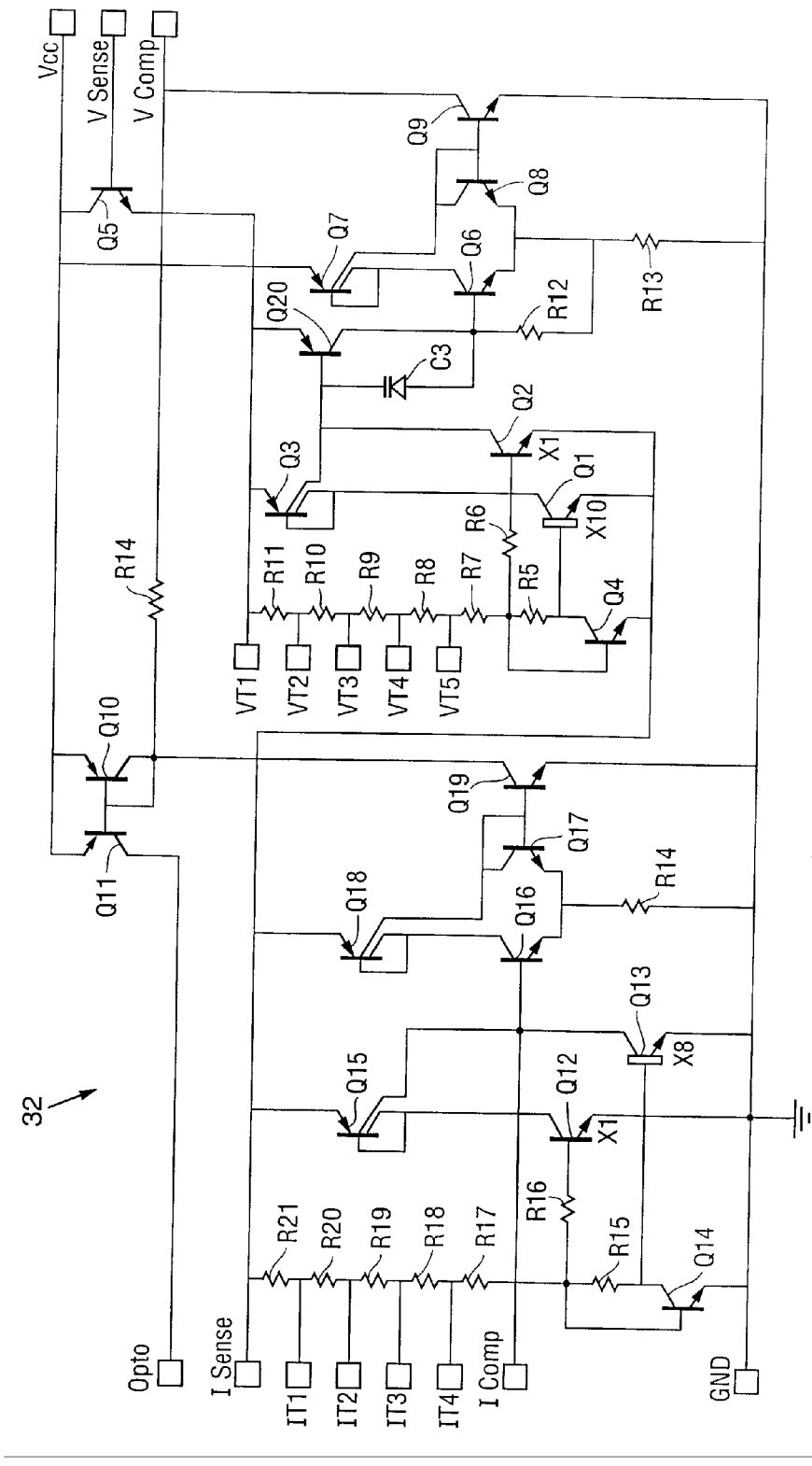

FIG. 5 is a schematic diagram of the circuitry of the integrated circuit 32 of FIG. 4. As will be seen, the band-gap reference circuit 36 of FIG. 4 and part of the voltage error amplifier 34 are implemented using common or merged circuitry. The same is true of band-gap reference circuit 44 and current error amplifier 42. Referring first to the components that comprise the band-gap reference circuit 36 and voltage error amplifier 34, NPN transistors Q1 and Q2 are provided having emitters connected in common to terminal I Sense. As can be seen in FIG. 4, terminal I Sense is connected directly to the output return Vout−. Transistor Q1 has an emitter area that is ten times greater than the emitter area of transistor Q2. A multiple collector PNP transistor Q3 acts as a current mirror load for transistors Q1 and Q2 and functions to equalize the currents in transistors Q1 and Q2. Thus, smaller transistor Q2 will operate with a current density ten times the density of transistor Q1 and will thus produce a larger base-emitter voltage than Q1.

A third NPN transistor Q4 is provided having a collector connected to the base of transistor Q1, a base connected to the base of transistor Q2 through a resistor R6 and an emitter also connected to terminal I Sense. The base of transistor Q4 is also connected to the emitter of an NPN transistor Q5 by way of series-connected resistors R7, R8, R9, R10 and R11. The base of transistor Q5 being connected to terminal V Sense and the collector is connected to terminal Vcc. A resistor R5 is connected between the base and collector of transistor Q4. As is well know, when transistors Q1 and Q2 operate with a current density of ten to one, the smaller transistor Q2 will have a base-emitter voltage which is 60 millivolts greater than the base-emitter voltage of Q1 at room temperature. The difference in base-emitter voltage (ΔVbe) will be dropped across resistor R5, ignoring the small drop across resistor R6 due to the relatively small base current of transistor Q2. The 60 millivolt voltage drop across R5 will produce a current which will flow through resistor R5 together with series-connected resistors R7, R8, R9, R10 and R11. Internal voltage trim pads VT1, VT2, VT3, VT4 and VT5 are provided for adjusting the magnitude of the voltage reference by allowing selective shorting of two or more of the internal pads together prior to packaging of the integrated circuit. These trim pads are connected at various points along the string of resistors R7, R8, R9, R10 and R11 as can be seen in FIG. 5 so that resistors R8, R9, R10 and R11 an be selectively shorted.

A PNP transistor Q20 is provided having an emitter connected to the emitter of Q3, a base connected to one of the collectors of Q2 and a collector connected to the input of a current amplification circuit sometimes referred to as a composite Darlington circuit. The composite Darlington circuit includes NPN transistors Q6 and Q8 connected as a differential pair and a multiple collector PNP transistor Q7 functioning as a load for the differential pair. A resistor R13, connected between the common emitters of Q6 and Q8 and terminal GND functions as a tail current source for the differential pair. A further resistor R12 is connected between the base and emitter of transistor Q6 for biasing the transistor. The base and collector of transistor Q8 are connected together thereby directly connecting the inverting input and the output of a differential amplifier formed by transistors Q6 and Q8 so that the voltage gain of the amplifier will be unity. The amplifier output, the base/collector of Q8, is connected to the base of a further NPN transistor Q9, with the collector of Q9 being connected to terminal V Comp and to the collector of another PNP transistor Q10. The emitter of transistor Q9 is connected to terminal GND.

Transistor Q10 together with PNP transistor Q11 function as a current mirror circuit. Diode-connected transistor Q10 has a base and emitter connected in common with the respective base and emitter of current mirror output transistor Q11. The output of the current mirror circuit, the collector of transistor Q11, is connected to terminal Opto which is connected to the anode of optical coupler diode 28A, as can be seen in FIG. 4.

The operation of the voltage regulator aspect of the present invention will now be described in connection with both FIGS. 4 and 5. Assume initially that the output voltage Vout+ is below the target regulated voltage as determined by resistors R1 and R2 in accordance with equation (1), above. At that point, transistor Q9 will not be conducting so that transistor Q10 will also be non-conductive (assuming also that transistor Q19 is off). The current mirror output transistor Q11 will thus source no current to terminal Opto connected to the anode of the diode 28A of the optical coupler 28. This will cause the Line-Side Controller 14 (FIG. 1) to begin increasing the magnitude of voltage Vout+. The voltage at terminal Vcc, connected to Vout+ will increase thereby increasing current flow through the series-connected resistors, including resistor R5. Vout+ will increase until the base-emitter voltages of transistors Q1 and Q2 are sufficiently large to start the two transistors to turn on. When both transistors are conducting equal currents, the voltage drop across resistor R5 is equal to 60 millivolts, as previously noted.

The values of voltage divider resistors R7, R8, R9, R10 and R11 are selected, relative to R5, such that when R5 has a voltage drop of 60 millivolts, the voltage drops across the resistors R7, R8, R9, R10 and R11 are 980, 240, 120, 60 and 30 millivolts, respectively, to give a total of 1430 millivolts. Assuming that the base-emitter voltages of transistor Q4 and Q5 are 600 and 670 millivolts, respectively, at room temperature, the voltage at terminal V Sense is 2.70 volts when the drop across resistor R5 has increased to 60 millivolts.

When the voltage at terminal Vsense starts to exceed 2.70 volts, transistor Q2 will begin to conduct more current than Q1. Since transistor Q3 will source equal currents to Q1 and Q2, the increase in Q2 current will be provided by the base of transistor Q20, causing Q20 to conduct more current and causing the collector voltage of Q20 to increase. The increase in collector voltage of Q20 is applied to the input of the unity gain stage which includes transistors Q6 and Q8. The output of the unity gain stage, the base/collector of Q8, will also increase thereby increasing the base voltage of transistor Q9 and the collector current of Q9. The resultant current flow through Q10, Q11 and optical coupler diode 28A will cause the Line-Side Controller 14 (FIG. 1) to slightly decrease the output voltage Vout+. This will cause the voltage at terminal V Sense to drop thereby causing the voltage across resistor R5 to eventually fall below 60 millivolts at room temperature so that mirror output transistor Q11 will stop sourcing current to coupler diode 28A. This feedback action will continue thereby causing the voltage at terminal V Sense to be maintained at 2.70 volts and, therefore, the voltage Vout+ to be maintained at the target regulated output voltage level.

Transistors Q1 and Q2, together with the associated circuitry form a band-gap reference circuit which will maintain the voltage at terminal V Sense at the desired 2.70 volts over a fairly wide temperature range. As is well known, a band-gap reference circuit operates to combine a first voltage having a positive temperature coefficient with a second voltage having a negative coefficient, with the magnitudes of the first and second voltages being selected so that the overall temperature coefficient is near zero. In the present case, current though resistor R5 is proportional to the difference in base-emitter voltages (ΔVbe) of transistors Q1 and Q2, a voltage having a positive temperature coefficient. Since this current also flows through resistors R7, R8, R9, R10 and R11, the voltage drops across these resistors, which total 1430 millivolts, will also have a positive temperature coefficient. The base-emitter voltages of transistors Q4 and Q5, which total 1270 millivolts, have a negative temperature coefficient. The voltage drops across resistors R7, R8, R9, R10 and R11 and the base-emitter junctions of transistors Q4 and Q5 are connected in series so that the total voltage drop between at terminals I Sense and V Sense will be 2.70 volts.

The total voltage drop of 2.70 volts will have an overall temperature coefficient that is near zero since the positive and negative temperature coefficients offset one another. Resistor R6 produces a small voltage inversely related to the temperature-dependent current gain of transistor Q2 and provides second order temperature compensation so that the overall temperature coefficient of the band-gap output voltage is closer to zero over a specified temperature range. Pads VT1–VT5 can be used to trim the band-gap voltage over a range of about 450 millivolts. By way of example, shorting pads VT1 and VT2 will reduce the band-gap voltage by 30 millivolts assuming the resistor values for R7, R8, R9, R10 and R11 have been selected as noted above. Capacitor C3 connected between the bases of transistors Q5 and Q6 is a frequency compensation capacitor.

It can be seen from the foregoing that the magnitude of the voltage at terminal V Sense which exceeds the band gap reference voltage of 2.70 volts can be considered an error voltage which is amplified by the remainder of the circuitry. Transistors Q1 and Q2 act as a first stage which provides some voltage gain, with most of the voltage gain being provided by the second stage transistor Q20. Transistors Q6, Q8 and Q9 act as a voltage-to-current converter output stage. Thus, the magnitude of the output current of Q9 (and thus the optical coupler diode 28A current) is directly proportional to the magnitude of the error voltage at terminal V Sense.

It is important that there be a high loop gain at very low frequencies so that the DC output impedance of the regulator will be very low. This will ensure an excellent stability of the DC output when the load varies from no load to maximum load. Further, there should be significant gain at around 50–120 Hz in order to reject the ripple at the line frequency. This eliminates the requirement of using bulky and expensive filter capacitors. The loop gain should be well less than 0 dB at the switching frequency, typically 25 to 100 Khz or more, so that noise at the switching frequency is attenuated rather than amplified. When this condition is not fulfilled, the optical coupler 28 may start switching at the switching frequency rather than having a smooth linear operation, with such linear operation functioning to counteract the effects of the DC load and line ripple on the output. Further, in some applications where the power supply load could vary suddenly, the loop response may have to be adjusted in order to improve the transient response of the regulator. This is achieved by frequency compensating the loop so as to boost the gain in a frequency range situated at a few Khz but definitely less than the switching frequency.

Referring now to the current limit circuitry, amplifier 42 (FIG. 4) and band-gap reference circuit 44 are also merged into common circuitry. NPN transistors Q12 and Q13 are provided, with transistor Q13 having an emitter area eight times the size of Q12. The emitters of Q12 and Q13 are connected in common to terminal GND. A multiple collector PNP load transistor Q15 operates to maintain equal collector currents for Q12 and Q13. The emitter of Q15 is connected to terminal I Sense. A resistor R15 has one terminal connected directly to the base of Q13 and another terminal connected to the base of Q12 by way of a resistor R16.

Ignoring the small voltage drop across resistor R16, a ΔVbe voltage is dropped across resistor R15. Given the ratio of current densities of 8 to 1 when equal currents are flowing through Q12 and Q13, ΔVbe will be 54 millivolts at room temperature. The positive temperature coefficient current though resistor R15 will also flow through resistors R17, R18, R19, R20 and R21 which are connected in series between resistor R15 and terminal I Sense. The series-connected resistors are sized relative to R15 so that the voltage drops across R17, R18, R19, R20 and R21 are 541, 108, 54, 27 and 13 millivolts, respectively, when the drop across R15 is 54 millivolts. Current limit internal trim pads IT1, IT2, IT3 and IT4 are connected at the terminals of the series connected resistors so that the current limit trip point can be adjusted prior to packaging on the integrated circuit. There is a further internal trim pad (not depicted) electrically connected to terminal I Sense.

The collector of transistor Q13 is connected to terminal I Comp and to a voltage-to-current converter circuit that includes transistors Q16, Q17, Q18 and Q19. Transistors Q16 and Q17 form a differential pair, with the common emitters connected to terminal GND by way of a resistor R14 which functions as a tail current source for Q16 and Q17. Multiple collector PNP transistor Q18 acts as an active load for Q16 and Q17. The collector and base of Q17 are connected together so that a unity gain amplifier circuit is formed. The output of the amplifier is connected to the base of NPN transistor Q19 that has a collector connected to the collector/base of current mirror input transistor Q10 and an emitter that is connected to terminal GND.

As previously noted in connection with FIG. 4, the voltage between terminals I Sense and GND is the voltage drop developed across current sense resistor Rs. Current limiting takes place when the current is sufficiently large to develop a voltage across Rs of 1.33 volts, as will be described. At lower currents, transistor Q19 is off so that the input to the current mirror circuit formed by transistors Q10 and Q11 is controlled exclusively by the voltage regulator circuitry output transistor Q9. Should the voltage drop across the current sense resistor Rs increase to a value such that the voltage drop across resistor R15 is 54 millivolts, the drop across resistors R17, R18, R19, R20 and R21 will total 743 millivolts. This voltage is connected in series with the base-emitter voltage of transistor Q14 which is 610 millivolts at room temperature. Thus, the voltage at terminal I Sense relative to terminal GND at current limit is 1.35 volts, a value that can be trimmed to the exemplary target value of 1.33 volts be shorting out selected trim pads IT1, IT2, IT3 and IT5 and the trim pad associated with terminal I Sense. By way of example, the nominal trip point can be reduced by 13 millivolts by shorting out the trim pad associated with terminal I Sense and trim pad IT1 or reduced by an additional 27 millivolts by shorting out pads IT1 and IT2.

Once the voltage drop across resistor Rs has reached 1.33 volts (or whatever the trimmed voltage is), the voltage applied to the unity gain amplifier input at the base of transistor Q16 will increase as will the amplifier output applied to the base of transistor Q19. Transistor Q19 will begin conducting and will cause the current mirror output transistor Q11 to source current to optical coupler diode 28A. This will cause the output voltage Vout+ to drop, regardless of the state of transistor Q9 of the voltage regulating circuitry, thereby limiting the output current. The band-gap voltage is stable over temperature in that the positive temperature coefficient voltage drop across resistors R17, R18, R19, R20 and R21 compensates for the negative temperature coefficient of the base-emitter voltage of transistor Q14. Resistor R16 provides second order temperature compensation in the same manner as does resistor R6.

As previously described, since band-gap reference circuit and associated circuitry are powered by the voltage drop across the current sense resistor Rs, the current limit function can be carried out even if the power supply outputs Vout+ and Vout− are shorted together. It can be seen that the regulated output voltage and the current limit point are separately controlled and can be independently set to precise values that are stable over temperature. The controller circuit includes a current mirror that sources the current at terminal I Sense for driving the optical coupling diode 28A. The cathode of the diode 28A can thus be grounded thereby providing maximum noise rejection and low output ripple.

Thus, a controller for switch mode power supplies has been disclosed which can be readily implemented at low cost in a single integrated circuit. Although one embodiment has been described in some detail, it is to be understood that certain changes can be made which would be obvious to those skilled in the art without departing from the spirit and scope of the present invention as defined by the appended claims. By way of example, multiple collector transistors Q3, Q7, Q15 and Q18 should each be viewed as two transistors, each of which has merged emitters and bases and separate collectors. Each of these devices could be replaced with two separate transistors having separate emitters, bases and collectors, with the respective separate emitters and bases being electrically connected together by metallization or the like.

What is claimed is:

1. A power supply controller for use in a power supply which provides a load current at a regulated output voltage, said power supply controller being formed in a single integrated circuit and comprising:

a current sense input configured to receive a current sense voltage indicative of a magnitude of the load current;

current limit circuitry, including a first band-gap reference circuit powered by the current sense voltage, and configured to provide a first output indicative of a relative magnitudes of the current sense voltage and a first reference voltage, with the first reference voltage being produced by the first band-gap reference circuit;

voltage control circuitry configured to provide a second output indicative of a relative magnitudes of an output sense voltage related to the regulated output voltage and a second reference voltage; and combining circuitry configured to provide a feedback signal based on the first and second outputs.

2. The power supply controller of claim 1 wherein the current limit circuit includes an amplification stage responsive to the band-gap reference circuit and powered by the current sense voltage.

3. The power supply controller of claim 2 wherein the voltage control circuitry includes a second band-gap reference circuit configured to produce the second reference voltage.

4. The power supply controller of claim 3 wherein the current sense input includes first and second integrated circuit terminals which receive the current sense voltage and wherein the first band-gap circuit includes a positive temperature coefficient circuit element and a negative temperature coefficient circuit element connected in series between the first and second integrated circuit terminals.

5. The power supply controller of claim 4 wherein the positive temperature coefficient circuit element includes a first resistor that conducts a current related to a difference in base-emitter voltage of a pair of bipolar transistors and the negative temperature coefficient circuit element includes a base-emitter junction of a bipolar transistor.

6. The power supply controller of claim 5 wherein the positive temperature coefficient circuit element includes a plurality of resistors, including the first resistor, connected in series so as to conduct the current related to a difference in base-emitter voltage.

7. The power supply controller of claim 6 wherein the positive temperature coefficient circuit element includes trim pads to permit selected ones of the plurality of resistors to be electrically shorted.

8. The power supply controller of claim 5 further including a third integrated circuit terminal and the combining circuitry includes a current mirror circuit having a current mirror input that receives the first and second outputs and a current mirror output coupled to the third integrated circuit terminal.

9. The power supply controller of claim 8 further including a fourth integrated circuit terminal and wherein the second band-gap reference circuit includes a positive temperature coefficient circuit element and a negative temperature coefficient circuit element connected in series between the first and a fourth integrated circuit terminals.

10. The power supply controller of claim 9 wherein the positive temperature coefficient circuit element of the second band-gap reference circuit includes a second resistor that conducts a second current related to a difference in base-emitter voltages of a pair of bipolar transistors and the negative temperature coefficient circuit element of the second band-gap reference circuit includes a base-emitter junction of a bipolar transistor.

11. The power supply controller of claim 10 where the positive temperature coefficient circuit element includes a plurality of resistors, including the second resistor, connected in series so as to conduct the second current related to a difference in base-emitter voltage.

12. The power supply controller of claim 11 wherein the negative temperature coefficient circuit element of the second band-gap reference circuit includes a first base-emitter junction of a first bipolar transistor.

13. The power supply controller of claim 12 wherein the first bipolar transistor has a base connected to the fourth integrated circuit terminal.

14. The power supply controller of claim 13 wherein the negative temperature coefficient circuit element of the second band-gap reference circuit further includes a second base-emitter junction of a second bipolar transistor having an emitter connected to the first integrated circuit terminal.

15. The power supply controller of claim 14 where the positive temperature coefficient circuit element of the second band-gap reference circuit includes trim pads to permit selected ones of the plurality of resistors to be electrically shorted.

16. The power supply controller of claim 15 wherein the current limit circuit includes an bipolar transistor having an emitter coupled to the second integrated circuit terminal and a collector coupled to the input of the current mirror circuit and wherein the voltage control circuitry includes a bipolar transistor having an emitter coupled to the second integrated circuit terminal, and a collector coupled to the input of the current mirror circuit.

17. The power supply controller of claim 16 further including a fifth integrated circuit terminal and wherein the current mirror circuit includes a bipolar transistor having an emitter coupled to the fifth integrated circuit terminal and a collector which forms the current mirror circuit output and another bipolar transistor having an emitter coupled to the fifth integrated circuit terminal and a collector that forms the input of the current mirror circuit.

18. A power supply controller for use in a power supply which provides a load current at a regulated output voltage, said power supply controller being formed in an integrated circuit having first, second, third and fourth integrated circuit terminals, said controller including:

current limit circuitry configured to provide a first output indicative of a magnitude of a current sense signal indicative of the load current and a reference, with the current limit circuit including a first band-gap reference circuit which includes a positive temperature coefficient circuit element and a negative temperature coefficient circuit element connected in series between the first and second integrated circuit terminals;

voltage control circuitry configured to provide a second output indicative of a relative magnitude of a voltage sense signal related to the regulated output voltage and a second reference, with the voltage control circuitry including a second band-gap reference circuit which includes a positive temperature coefficient circuit element and a negative temperature coefficient circuit element connected in series between the first and fourth integrated circuit terminals; and combining circuitry configured to provide a feedback signal to the third integrated circuit output terminal in response to the first and second outputs.

19. The power supply controller of claim 18 wherein the first-band gap circuit includes a first and second bipolar transistors configured to operate at differing current densities so as to produce respective base-emitter voltages of differing magnitudes, with the positive temperature coefficient circuit element of the first band-gap voltage connected to conduct a current related to the differing magnitude base-emitter voltages, with the first and second bipolar transistors having emitters coupled to the second integrated circuit terminal.

20. The power supply controller of claim 19 where the first and second bipolar transistors each have collectors coupled to the first integrated circuit terminal by way of an active load.

21. The power supply controller of claim 20 wherein the second-band gap circuit includes a third and fourth bipolar transistors configured to operate at differing current densities so as to produce respective base-emitter voltages of differing magnitudes, with the positive temperature coefficient circuit element of the second band-gap voltage connected to conduct a current related to the differing magnitude base-emitter voltages, with the third and fourth bipolar transistors having emitters coupled to the first integrated circuit terminal.

22. The power supply controller of claim 21 further including a fifth integrated circuit terminal and wherein the combining circuitry includes a current mirror circuit which includes fifth and sixth bipolar transistors, each having an emitter coupled to the fifth integrated circuit terminal and each having bases coupled together, with a collector of the fifth transistor being coupled to the third integrated circuit terminal and with a collector of the sixth transistor being coupled to receive the first and second outputs.

23. A power supply controller for use in a power supply which provides a load current at a regulated output voltage, said controller including:

a current sense resistor connected to conduct the load current and disposed intermediate first and second circuit nodes;

a first band-gap circuit which includes a pair of bipolar transistors, a positive temperature coefficient circuit element producing a voltage derived from a difference in base-emitter voltages of the pair of bipolar transistors and a negative temperature coefficient circuit element coefficient, with the positive and negative temperature coefficient elements connected in series between the first and second circuit nodes;

a drive transistor responsive to the first band-gap circuit and connected to provide a first output, with the first output having a state determined by a magnitude of the current sense voltage; and an optical coupler having an input responsive to the first output and an output to be connected to a regulator circuit.

24. The power supply controller of claim 23 further including a voltage control circuitry configured to provide a second output indicative of a relative magnitude of a sense voltage related to the regulated output voltage and a second reference voltage and with the optical coupler being responsive to both the first and second outputs.

25. The power supply controller of claim 24 wherein the voltage control circuitry includes a second band-gap circuit which produces the second reference voltage, with the second band-gap circuit including positive and negative temperature coefficient circuit elements connected in series to form a serial circuit, with one end of the serial circuit connected to the first circuit node.

26. The power supply controller of claim 25 wherein the first band-gap circuit, the drive transistor and the voltage control circuitry are formed in a common integrated circuit.

* * * * *

UNITED STATES PATENT AND TRADEMARK OFFICE
CERTIFICATE OF CORRECTION

PATENT NO.     : 6,636,025 B1
DATED          : October 21, 2003
INVENTOR(S)    : Pierre R. Irissou It is certified that error appears in the above-identified patent and that said Letters Patent is hereby corrected as shown below:

<u>Drawings,</u>
Delete Figs. 1-5, and replace with the enclosed Figs. 1-5.

Signed and Sealed this

Sixth Day of April, 2004

JON W. DUDAS
*Acting Director of the United States Patent and Trademark Office*